D. MOULDER.
STEERING ADJUSTER FOR AUTOMOBILES.
APPLICATION FILED SEPT. 6, 1919.
1,349,469.  Patented Aug. 10, 1920.
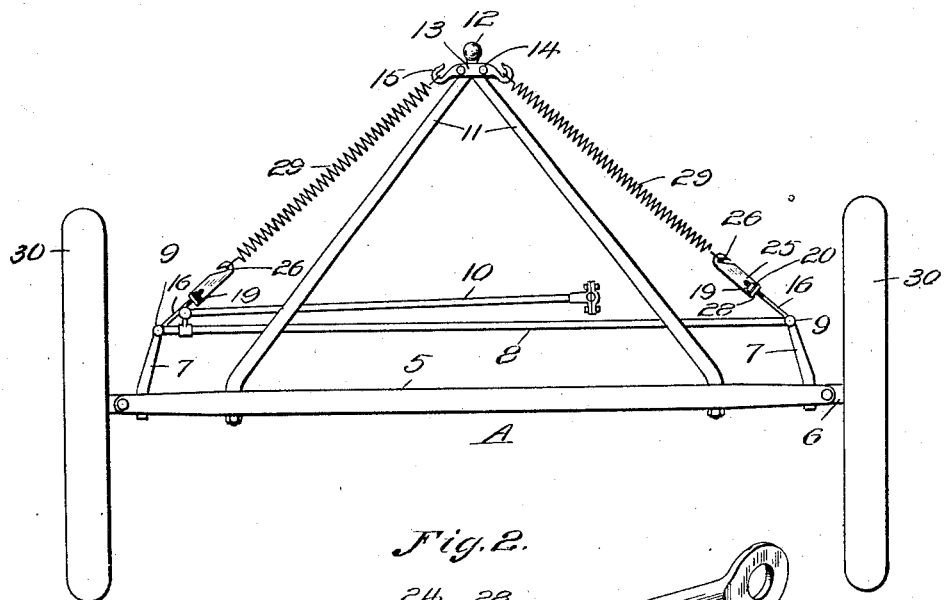
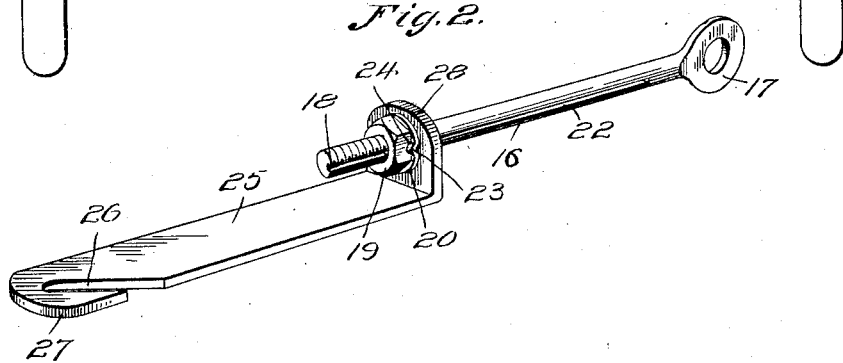
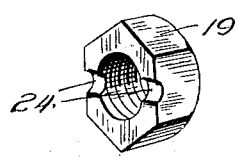
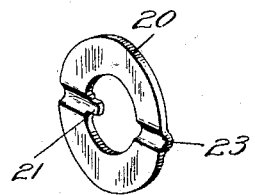
Inventor
D. Moulder.
By Geo. P. Kimmel
Attorney

UNITED STATES PATENT OFFICE.

DUNCAN MOULDER, OF SAN ANTONIO, TEXAS.

STEERING-ADJUSTER FOR AUTOMOBILES.

1,349,469.  Specification of Letters Patent.  Patented Aug. 10, 1920.

Application filed September 6, 1919. Serial No. 322,110.

*To all whom it may concern:*

Be it known that I, DUNCAN MOULDER, a citizen of the United States, residing at San Antonio, in the county of Bexar and State of Texas, have invented certain new and useful Improvements in Steering-Adjusters for Automobiles, of which the following is a specification.

The invention relates to an automatic adjuster for the steering gear of automobiles, and more particularly to the class of spring adjusters for attachment to the steering knuckle arms and the front radius yoke of the Ford type of automobiles.

The primary object of the invention is the provision of a device of this character, wherein the front steering wheels of an automobile, preferably of the Ford type, will be sustained in alinement with the rear wheels when the automobile is traveling in a straight course and at the same time avoids any possibility of the locking of the wheels when turned in the guiding of the automobile in a curved course, the device being of novel construction to permit the ready and convenient attachment thereof to the steering knuckle arms and to the front radius yoke of the automobile.

Another object of the invention is the provision of a device of this character wherein the proper tension is had upon the front steering wheels of an automobile and the tension is equalized on the opposite sides of the longitudinal axis of the said automobile so as to sustain the steering wheels in true alinement at the front of the automobile with the rear wheels thereof and also will assure comfort and ease to the driver of the automobile as it will avoid undue jerking action of the hand steering wheel in the travel of the automobile in a direct course or straight path.

A further object of the invention is the provision of a device of this character, wherein the front wheels of an automobile are prevented from wabbling movement, particularly when the automobile is traveling at high speed and thereby relieving the operator of the automobile from maintaining a firm grip upon the hand steering wheel in the guiding of the automobile in a straight course, the device being readily adjustable to permit true alinement of the front wheels of the automobile with the rear wheels thereof and the said front wheels will be sustained in such true alinement when the automobile is traveling in the straight course.

A still further object of the invention is the provision of a device of this character, which is extremely simple in construction, readily and easily applied to the steering knuckle arms of the steering gear of the automobile and the front radius yoke thereof, easily adjusted, strong, durable, and inexpensive to manufacture and install.

With these and other objects in view, the invention consists in the features of construction, combination and arrangement of parts, as will be hereinafter fully described, illustrated in the accompanying drawing and pointed out in the claim hereunto appended.

In the accompanying drawing:

Figure 1 is a top plan view of the front axle assembly and front radius rod yoke of the Ford type of automobile, showing the device constructed in accordance with the invention applied.

Fig. 2 is a perspective view of one of the spring attaching hooks and the adjustable connecting bolts of the device.

Fig. 3 is a perspective view of the adjusting nut for the connecting bolts.

Fig. 4 is a perspective view of the lock washer for the bolts shown in Fig. 3.

Similar reference characters indicate corresponding parts throughout the several views in the drawings.

Referring to the drawing in detail, A designates generally the front axle assembly of the Ford type of automobile, including the front axle beam 5 having pivoted at opposite ends the usual turning knuckle or front wheel spindle 6 and their knuckles are formed with the arms 7 of the ordinary well known construction to which is connected the spindle connecting rod 8, which as usual is pivoted at opposite ends to the arms 7 through the medium of removable bolts 9 and to this rod 8 is attached the steering gear connecting rod 10 controlled and operated in the usual well known manner.

Bolted or otherwise fastened to the front axle beam 5 is the radius rod yoke 11, formed as usual with the rear ball terminal 12 which is clamped in the ordinary well known manner to the oil pan beneath the engine or motor in the automobile.

The steering gear adjuster comprises a double hoop member 13, which is clipped or otherwise fastened at 14 upon the ball terminal portion 12 of the radius rod yoke 11 to lie crosswise thereof with the hooks 15 projecting laterally from opposite sides of said yoke, while detachably fastened to the spindle arms 7 by the bolts 9 which connect the spindle connecting rod 8 thereto are eye bolt members 16, each at the eye end 17 thereof receiving the bolt member 9 which detachably fastens the said bolt member 16 to the spindle arm 7, the bolt members 16 being formed with threaded end portions 18 on each of which is adjustably mounted a nut 19 which is adapted to work against a lock washer 20, the same being formed with a lug 21 projecting into the central opening therein receiving the bolt member 16 to engage in a groove 22 formed longitudinally in the threaded end portion of said bolt member 16 and in this manner the washer 20 is prevented from rotation upon the bolt member, but is free for longitudinal sliding movement thereon. The lock washer 20 is formed with radial locking ribs 23 which are adapted to fit corresponding recesses 24 formed in the nut 19 for the locking of the said nut then engaged with the washer 20 when threaded upon the bolt member 16.

Engaged upon the bolt member 16 and fastened thereon in adjusted position are hooks 25, each being in the form of a relatively narrow plate having near one end a diagonally disposed slot 26 forming the hooks 27, each slot 26 being extended through one longer edge of said plate, while at the opposite end of this plate is a right angular ear 28 which is engaged upon the bolt member 16 and works against the washer 20 abutting the nut 19 upon said bolt member.

Engaged with the hooks 27 are the forward end portions of coiled retractile springs 29 which are arranged in rearwardly convergent relation to each other and have their opposite end portions engaged on the hooks 15 of the member 13 fastened to radius rod yoke 11 and these springs 29 function to sustain the front wheels 30 on the spindles 6 in neutral position for true alinement with the rear wheels of the automobile.

It will be clearly apparent that the springs 28 can be varied by the adjustment of the hooks 25 on the bolt members 16, when the device is applied to the steering gear of the automobile. The device in its operation avoids any possibility of the locking of the wheels 30, when turned for directing the automobile about a curve in turning corners and also will relieve strain from the operator of the automobile when holding the hand steering wheel in guiding the said automobile. Furthermore the device will sustain the front wheels 30 in a straight course and will avoid the necessity of the operator of the automobile from firmly gripping the hand steering wheel when said automobile is traveling in a straight path.

From the foregoing it is thought that the construction and manner of use of the device will be clearly understood and therefore a more extended explanation has been omitted.

What is claimed is:

An adjuster of the character described comprising a double hook member adapted to be secured to the front radius rods of an automobile, bolt members adapted to be connected to the spindle arms of a front axle assembly of said automobile, hooks adjustably connected to said bolt members, and coiled tension springs connected with the double hook members and said hooks on the bolt members.

In testimony whereof, I affix my signature hereto.

DUNCAN MOULDER.